United States Patent
Choi et al.

(10) Patent No.: US 9,853,355 B2
(45) Date of Patent: Dec. 26, 2017

(54) ELECTRONIC DEVICE CASE WITH ANTENNA AND ELECTRONIC DEVICE FOR USE THEREWITH

(71) Applicant: Samsung Electronics Co., Ltd., Gyeonggi-do (KR)

(72) Inventors: Chi Jeong Choi, Gyeonggi-do (KR); Yun Bum Lee, Busan (KR)

(73) Assignee: Samsung Electronics Co., Ltd (KR)

( * ) Notice: Subject to any disclaimer, the term of this patent is extended or adjusted under 35 U.S.C. 154(b) by 126 days.

(21) Appl. No.: 14/678,191

(22) Filed: Apr. 3, 2015

(65) Prior Publication Data

US 2015/0288056 A1    Oct. 8, 2015

(30) Foreign Application Priority Data

Apr. 3, 2014    (KR) .................. 10-2014-0039845

(51) Int. Cl.
| | |
|---|---|
| *H01Q 1/44* | (2006.01) |
| *H01Q 1/50* | (2006.01) |
| *H04B 1/3888* | (2015.01) |
| *H01Q 21/28* | (2006.01) |
| *H01Q 9/04* | (2006.01) |
| *H01Q 9/42* | (2006.01) |
| *H04M 1/725* | (2006.01) |

(52) U.S. Cl.
CPC ................ *H01Q 1/44* (2013.01); *H01Q 1/50* (2013.01); *H04B 1/3888* (2013.01); *H01Q 9/0421* (2013.01); *H01Q 9/42* (2013.01); *H01Q 21/28* (2013.01); *H04M 1/72527* (2013.01)

(58) Field of Classification Search
CPC ..... H04B 1/3888; H04M 1/0283; H01Q 1/44; H01Q 1/40
USPC ..................................................... 455/575.8
See application file for complete search history.

(56) References Cited

U.S. PATENT DOCUMENTS

| | | | |
|---|---|---|---|
| 7,187,959 B2 | 3/2007 | Ponce De Leon et al. | |
| 7,482,982 B2 | 1/2009 | Jenwatanavet et al. | |
| 7,840,243 B2 * | 11/2010 | Hirai ................ | H01Q 1/243 379/428.01 |
| 8,694,057 B2 | 4/2014 | Park et al. | |
| 2005/0113037 A1 | 5/2005 | Ponce De Leon et al. | |

(Continued)

FOREIGN PATENT DOCUMENTS

| | | |
|---|---|---|
| CN | 103001659 | 3/2013 |
| KR | 1020080099324 | 11/2008 |

(Continued)

OTHER PUBLICATIONS

International Search Report dated May 29, 2015 issued in counterpart application No. PCT/KR2015/002727, 3 pages.

(Continued)

*Primary Examiner* — Robert Karacsony
(74) *Attorney, Agent, or Firm* — The Farrell Law Firm, P.C.

(57) ABSTRACT

A case for an electronic device is provided. The case includes a rear cover configured to attach to at least a portion of a rear side of the electronic device, and a front cover configured to removably cover at least a portion of a front side of the electronic device. The case also includes a connection portion that connects the front cover and the rear cover, and includes an antenna structure for transmitting and receiving signals in at least one frequency band.

19 Claims, 8 Drawing Sheets

(56) References Cited

U.S. PATENT DOCUMENTS

| | | | |
|---|---|---|---|
| 2007/0120748 A1 | 5/2007 | Jenwatanavet et al. | |
| 2008/0096620 A1 | 4/2008 | Lee et al. | |
| 2008/0161076 A1 | 7/2008 | Min et al. | |
| 2009/0140936 A1* | 6/2009 | Cho | H01Q 9/42 |
| | | | 343/702 |
| 2011/0165916 A1 | 7/2011 | Park et al. | |
| 2013/0249763 A1 | 9/2013 | Hsu | |
| 2014/0341197 A1 | 11/2014 | Hong et al. | |

FOREIGN PATENT DOCUMENTS

| | | |
|---|---|---|
| KR | 1020110080022 | 7/2011 |
| KR | 1020120013536 | 2/2012 |

OTHER PUBLICATIONS

European Search Report dated Aug. 6, 2015 issued in counterpart application No. 15162081.2-1811, 7 pages.

\* cited by examiner

ELECTRONIC DEVICE CASE WITH ANTENNA AND ELECTRONIC DEVICE FOR USE THEREWITH

PRIORITY

This application claims priority under 35 U.S.C. §119(a) to Korean Patent Application No. 10-2014-0039845, filed in the Korean Intellectual Property Office on Apr. 3, 2014, the content of which is incorporated herein by reference.

BACKGROUND OF THE INVENTION

1. Field of the Invention

The present invention relates generally to antenna technology for an electronic device, and more particularly, to antenna technology using a case of an electronic device.

2. Background of the Invention

As transmission and processing speeds of electronic devices used for wireless communication increase, devices such as smart phones, which provide a user assistance function in addition to a web surfing function, have become mainstream in wireless communication.

An electronic device typically includes an antenna for performing wireless communication. This antenna has developed into a built-in antenna device in order to enhance the portability of the electronic device.

A code division multiple access (CDMA), global system for mobile communication (GSM), or wideband CDMA (WCDMA) communication technique typically use three to four frequency bands. For example, an antenna installed in most WCDMA terminals only needs to support a frequency band of 2100 MHz (a WCDMA antenna needs to support a frequency band of 850 MHz/1900 MHz in North America). Also, in accordance with a long term evolution (LTE) technique, it is possible to use various frequency bands depending on a country or region for wireless communication.

Since an electronic device provides many functions, the types and numbers of chips and sensors installed in the electronic device has increased, and thus, the space in which an antenna may be mounted has decreased. Also, since an LTE service is provided at a plurality of bands, and thus, an antenna device that covers various frequency bands should be provided, a number of structurally different antennas may be required for wireless communication.

The electronic device may include an antenna for supporting Bluetooth (BT), Wi-Fi, global positioning system (GPS), near field communication (NFC), and infra-red data association (IrDA) communication, and an antenna for supporting digital multimedia broadcasting (DMB).

When the electronic device includes various types of antennas, various problems may result, such as, for example, lack of antenna mounting spaces, constraint on the design of the electronic device, and excessive heat emission. Also, mounting an antenna for a service that is used only in specific countries or an antenna for a communication frequency band that is not used outside specific countries causes inefficiency in productivity.

SUMMARY OF THE INVENTION

The present invention has been made to address at least the above problems and/or disadvantages and to provide at least the advantages described below. Accordingly, an aspect of the present invention provides a structure in which an antenna for a main band is mounted on an electronic device, an additional antenna is mounted on the case of the electronic device, and the case is attached to the electronic device so that the additional antenna operates.

According to an embodiment of the present invention, a case for an electronic device is provided. The case includes a rear cover configured to attach to at least a portion of a rear side of the electronic device, and a front cover configured to removably cover at least a portion of a front side of the electronic device. The case also includes a connection portion that connects the front cover and the rear cover, and includes an antenna structure for transmitting and receiving signals in at least one frequency band.

According to another embodiment of the present invention, an electronic device is provided that is attached to a case including a front cover, a connection portion, and a rear cover. The electronic device includes a processor, a chipset configured for use with at least one antenna in the connection portion of the case, and at least one feeding unit configured to connect to the at least one antenna in the connection portion of the case. At least a portion of a rear side of the electronic device is attached to at least a portion of the rear cover of the case, and the at least one feeding unit is disposed at the rear side of the electronic device and connected to at least one feeding terminal of the at least one antenna disposed in the rear cover of the case.

According to an additional embodiment of the present invention, an encased electronic device is provided that includes a processor, a chipset configured for use with at least one antenna, and at least one feeding unit configured to connect to the at least one antenna. The encased electronic device also includes a rear cover disposed on a rear side of the encased electronic device, a front cover configured to removably cover at least a portion of a front side of the encased electronic device, and a connection portion that connects the front cover and the rear cover, and includes the at least one antenna for transmitting and receiving signals in at least one frequency band.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
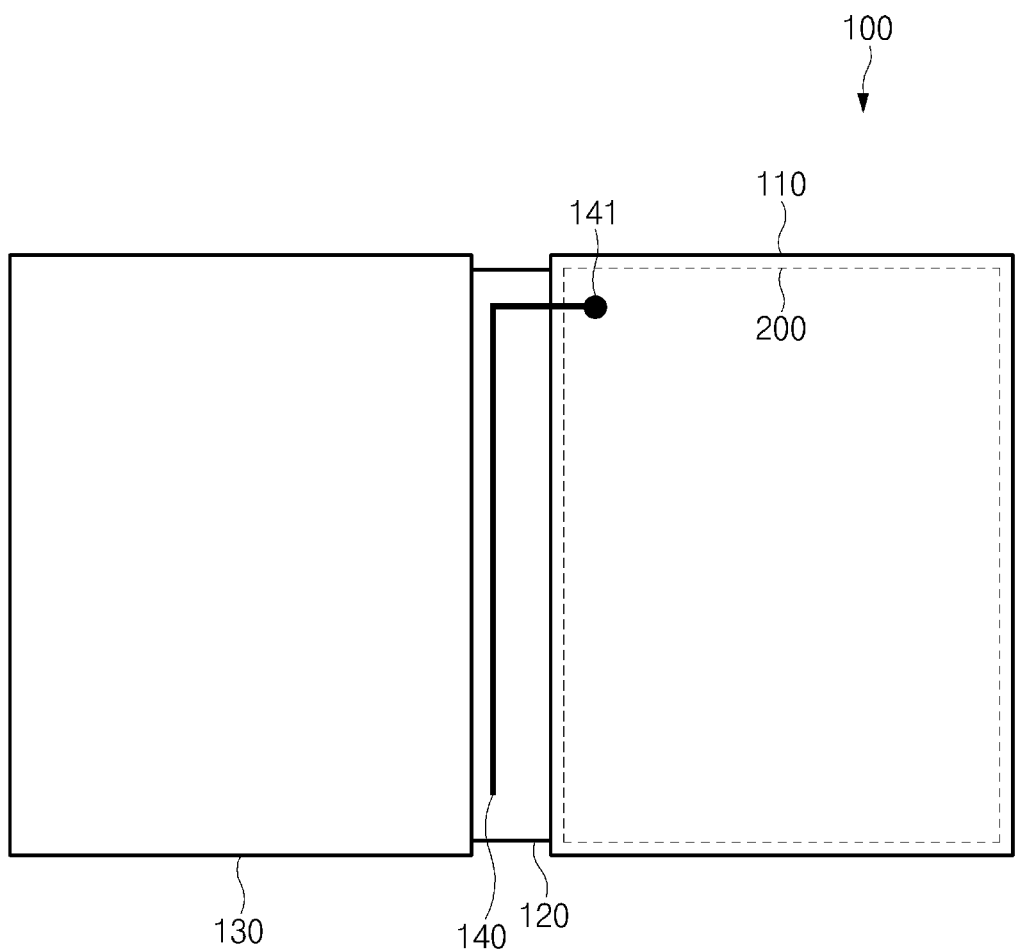
FIG. 1 is a diagram illustrating an electronic device and a case of the electronic device, according to an embodiment of the present invention.

Embodiments of the present invention are described in detail below with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The expression "include" or "may include" that may be used in various embodiments of the present invention indicates the presence of a disclosed corresponding function, operation, or component, but does not exclude one or more additional functions, operations or components. Furthermore, it should be understood that the term "includes" or "has" in various embodiments of the present invention indicates the presence of characteristics, numbers, steps, operations, components, parts, or combinations thereof represented in the present disclosure, but do not exclude the presence or addition of one or more other characteristics, numbers, steps, operations, components, parts, or combinations thereof.

In various embodiments of the present invention, the expression "or" or "at least one of A and/or B" includes any and all combinations of words enumerated along with the expression. For example, the expression "A or B" or "at least one of A and/or B" may include A, B, or both A and B.

The expression "a first", "a second", "firstly", or "secondly", in various embodiments of the present invention, may modify various components of various embodiments of the present invention, but do not limit corresponding components. For example, the expressions above do not limit the order and/or importance of corresponding components. The expressions above may be used to distinguish one component from another. For example, both a first user device and a second user device are user devices that are mutually different user devices. Further, without departing from the scope of rights of various embodiments of the present invention, a first component may be called a second component, and similarly, the second component may also be called the first component.

When it is described that any component is "connected to" or "accessed by" another component, it should be understood that the former can be directly connected to the latter, or there may be another component in between. On the contrary, when it is described that any component is "directly connected to" or "directly accessed by" another component, it should be understood that there may be no other component in between.

The terms used in various embodiments of the present invention are used only to describe specific embodiments and are not intended to limit the various embodiments of the present invention. The terms in singular form include the plural form unless otherwise specified.

Unless otherwise defined herein, all terms used herein including technical or scientific terms have the same meanings as those generally understood by a person ordinarily skilled in the art to which the various embodiments of the present invention pertain. Terms defined in generally used dictionaries should be construed to have meanings matching contextual meanings in the related art and should not be construed as having an ideal or excessively formal meaning unless otherwise defined herein.

An electronic device, according to an embodiment of the present invention, is a device that includes a communication function. For example, the electronic device may include at least one of a smart phone, a tablet personal computer (PC), a mobile phone, a video phone, an e-book reader, a desktop PC, a laptop PC, a net book computer, a personal digital assistant (PDA), a portable multimedia player (PMP), an MP3 player, a mobile medical device, a camera, and a wearable device (e.g., a head-mounted-device (HMD) such as electronic glasses, electronic clothing, an electronic bracelet, an electronic necklace, an electronic appcessory, an electronic tattoo, or a smart watch).

According to an embodiment of the present invention, the electronic device may be embodied as a smart home appliance having a communication function. The smart home appliance may include, for example, at least one of a TV, a digital video disk (DVD) player, an audio set, a refrigerator, an air conditioner, a cleaner, an oven, a microwave oven, a washing machine, an air cleaner, a set-top box, a TV box, a game console, an electronic dictionary, an electronic key, a camcorder, and an electronic frame.

According to an embodiment of the present invention, the electronic device may include at least one of various medical devices (e.g., a magnetic resonance angiography (MRA) device, a magnetic resonance imaging (MRI) device, a computed tomography (CT) device, a camera, and an ultrasonicator), a navigation system, a GPS receiver, an event data recorder (EDR), a flight data recorder (FDR), a car infotainment device, electronic equipment for a ship (e.g., a navigation device or gyro compass for a ship), avionics, a security device, a head unit for a vehicle, an industrial or home robot, a financial institution's automated teller machine (ATM) or a store's point of sales (POS) device.

According to an embodiment of the present invention, the electronic device may include at least one of a portion of a building/structure or furniture including a communication function, an electronic board, an electronic signature receiving device, a projector, and various measurement devices (e.g., a water, electricity, gas or electric wave measurement device). According to an embodiment of the present invention, the electronic device may be one or a combination of the above-described various devices. Moreover, electronic devices may be flexible devices. Moreover, it is obvious to a person ordinarily skilled in the art that electronic devices are not limited to the above-described devices.

Electronic devices are described with reference to the accompanying drawings, according to embodiments of the present invention. The term 'user' may indicate a person who uses an electronic device, or a device (e.g., an artificial-intelligence electronic device) that uses the electronic device.

FIG. 1 is a diagram illustrating an electronic device and a case of the electronic device, according to an embodiment of the present invention.

According to an embodiment of the present invention, a case 100 includes a rear cover 110 that is attached to the rear side of an electronic device 200, a connection portion 120 that includes an antenna structure 140, and a front cover 130 that covers the screen of the electronic device 200. The connection portion 120 connects the front cover 130 to the rear cover 110.

According to an embodiment of the present invention, the connection portion 120 extends from the rear cover 110 in one direction, and the front cover 130 is formed such that extends from the connection portion 120 in the same direction. Specifically, FIG. 1 shows that the connection portion 120 extends from the left side of the rear cover 110. However, the connection portion 120 may extend from the right, upper, or lower side of the rear cover 110 instead. In the following description, a case having a connection portion that extends from the left side to cover a screen is described.

In various embodiments of the present invention described herein, the term "case" may mean a casing that has a structure enabling the casing to be attached to and detached from the rear side of the electronic device, and enabling the front side of the electronic device to be covered due to an extension from a point at which the casing is attached to the rear side of the electronic device. For example, the case may refer to an accessory such as a flip cover, a smart cover, or a cover with stand.

According to an embodiment of the present invention, the electronic device 200 is attached to the rear cover 110. The electronic device 200 may have a rear battery, a universal subscriber identity module (USIM), or an external memory that is exposed. Since a portion of a board or a feeding structure is exposed, the electronic device 200 may be electrically connected to a feeding terminal 141 of the antenna 140 so that feeding (current) is supplied to the antenna 140.

Although FIG. 1 shows that the electronic device 200 has a region narrower than the rear cover 110, it is for the convenience of description, and the rear cover 110 may have a size suitable for being attached to the electronic device 200. For example, the region of the rear cover 110 may be the same as the rear region of the electronic device 200.

According to an embodiment of the present invention, the cover 100 has the antenna structure 140, such as an antenna radiator, in the connection portion 120. Although FIG. 1 illustrates a monopole antenna of a simple shape, it is for the convenience of description, and the length or shape of the antenna 140, and the feeding and ground structures may vary depending on a frequency band.

Having the antenna structure 140 in the connection portion 120 results in various advantages. For example, when the antenna structure 140 is located in the rear cover 110 or the front cover 130, the total thickness when the electronic device 200 is covered by the cover 100 increases compared with when the antenna structure 140 is not included in the front/rear cover. According to an embodiment of the present invention, when the antenna structure 140 is located at the connection portion 120 that connects the front cover 130 to the rear cover 110, it is possible to prevent the total thickness of the electronic device 200 from increasing.

When the antenna structure 140 is located at the rear cover 110, radiation interference may occur by an intermediate frequency (IF) connector, chipset, or other metallic parts that are located at the electronic device 200. When the antenna structure 140 is located at the front cover 130, a user may fold back the front cover 130 and then use the electronic device 200 while the front cover 130 is in contact with the rear cover 110, or may make a call while the front cover 130 covers the screen. In the former case, radiation interference may similarly occur, while in the latter case a specific absorption rate (SAR) may increase because the user is in close proximity to the antenna (in this case, radiation interference may also occur). According to an embodiment of the present invention, when the antenna structure 140 is located in the connection portion 120, the antenna structure 140 may be located in a relatively open space, thus, less radiation interference may occur and the SAR may decrease.

According to an embodiment of the present invention, the antenna structure 140 is not required to be located in a range of the connection portion 120. In order to implement a radiator pattern or connect to the electronic device 200, a portion of the antenna structure 140 may be expanded to the front cover 130 or the rear cover 110. According to an embodiment of the present invention, a large portion of the antenna structure 140 may be located in the connection portion 120.

According to an embodiment of the present invention, the antenna structure 140 may be configured to receive signals in various frequency bands. For example, the antenna 140 may receive terrestrial DMB (T-DMB) and/or satellite DMB (S-DMB). In general, a DMB frequency band is 174 MHz to 216 MHz (in the case of T-DMB) and has an even lower frequency band in comparison to a frequency band for general $3^{rd}$ generation (3G), $4^{th}$ generation (4G), and LTE communication. Thus, in order to receive a DMB signal, an antenna structure (e.g., a length of an antenna radiator) may relatively increase. With the size decrease and slimming of the electronic device, it may not be easy to mount such a DMB antenna on the electronic device 200.

According to an embodiment of the present invention, an antenna for receiving DMB may be mounted on the connection portion 120 of the case 100 and the feeding terminal 141 of the antenna 140 may be electrically connected to the feeding unit located at the rear side of the electronic device 200. Thus, it is possible to receive DMB by installing the case, without mounting a DMB antenna on the electronic device 200.

According to another embodiment of the present invention, alternatively or additionally, the antenna structure 140 configured to receive signals in various frequency bands may be included in the case 100. For example, the antenna structure 140 may correspond to an antenna (radiator) that supports at least one of LTE, LTE advanced (LTE-A), CDMA, WCDMA, universal mobile telecommunication system (UMTS), wireless broadband (WiBro), GSM network, Bluetooth, Bluetooth low energy (BLE), NFC, Wi-Fi, Wi-Fi Direct, or GPS. For example, the electronic device 200 may hold an antenna that supports LTE band 3, 8 and 26 provided in Korea and the case 100 may include an antenna structure that supports LTE bands 1, 40 and 41 provided in China. According to another embodiment of the present invention, in this case, the case 100 may include an antenna structure that supports LTE bands 4 and 7 provided in Canada. As such, a user may attach various cases with the electronic device 200 and use a roaming service without a constraint in a region to which the user will move or in which the user will stay, or a communication band provided by a communication company. As another example, the electronic device 200 may hold an antenna that supports an LTE network, and the case 100 may include an antenna structure 140 that supports Wi-Fi. As such, a user may use a Wi-Fi service in a place that Wi-Fi is free or LTE network does not work. According to an embodiment of the present invention, the chipset or transceiver Tx/Rx of the electronic device 200 connected to the antenna structure 140 of the case 100 or a processor of the electronic device, such as a communication processor (CP) or an application processor (AP), may provide proper settings for the operations of various antenna structures 140 included in the case.

In an embodiment of the present invention, in addition to when the built-in antenna (e.g., LTE B3) and the antenna included in the case (e.g., LTE B40) cover different frequency bands as described above, the antenna built in the electronic device 200 and the antenna included in the case may cover the same frequency band. The antenna built in the electronic device 200 and the antenna included in the case may mutually share certain frequency bands. As such, by using antennas that share at least some of the same frequency band, it is possible to enhance communication efficiency through transmit/receive diversity or multi-input multi-output (MIMO) technology.

Figure 2:
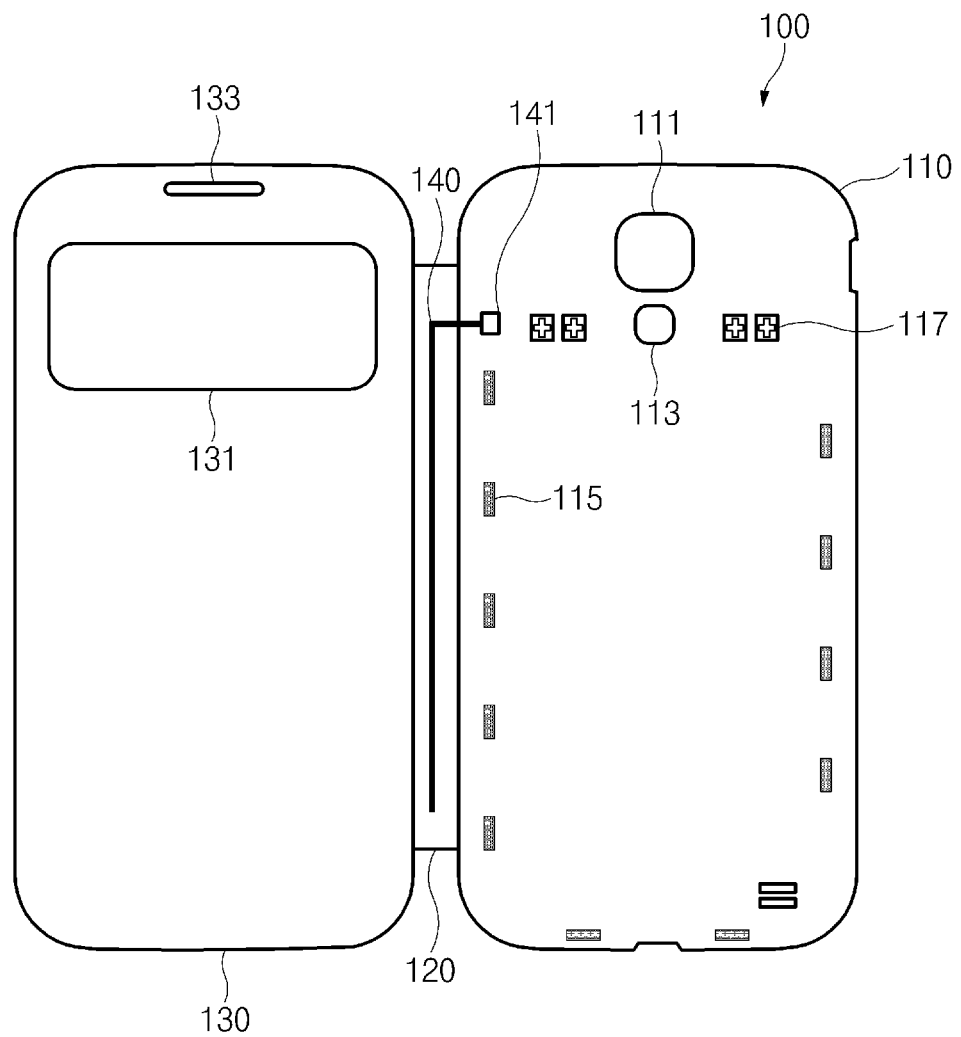
FIG. 2 is a diagram illustrating a case structure, according to an embodiment of the present invention.

FIG. 2 is a diagram illustrating a case structure, according to an embodiment of the present invention.

The case 100 includes the rear cover 110, the connection portion 120, and the front cover 130. According to an embodiment of the present invention, the rear cover 110 includes holes 111 and 113 for the rear camera of the electronic device, at least one attachment structure 115 for attaching to the rear side of the electronic device, and the feeding terminal 141 for connecting to the feeding unit of the electronic device. According to an embodiment of the present invention, the rear cover 110 further includes a region 117 for connection to another metallic part of the electronic device 200. According to an embodiment of the present invention, the rear cover 110 may further include a metallic structure for ground.

According to an embodiment of the present invention, the feeding terminal 141 is a terminal of the antenna structure 140 and may be fed from the electronic device 200 so that the antenna structure 140 receives a signal in a designated frequency band. According to an embodiment of the present invention, the antenna structure 140 is not exposed but located in the case 100, and the feeding terminal 141 is exposed from and disposed in a region of the rear cover 110.

According to an embodiment of the present invention, the front cover 130 includes a transparent window region 131 showing at least a portion of a display, and an open ear piece (or receiver) hole. The front cover 130 and the rear cover 110 may vary depending on a structure for attachment to various electronic devices and depending on the arrangement of the displays and front buttons/speakers/input buttons of the various electronic devices.

Figure 3:
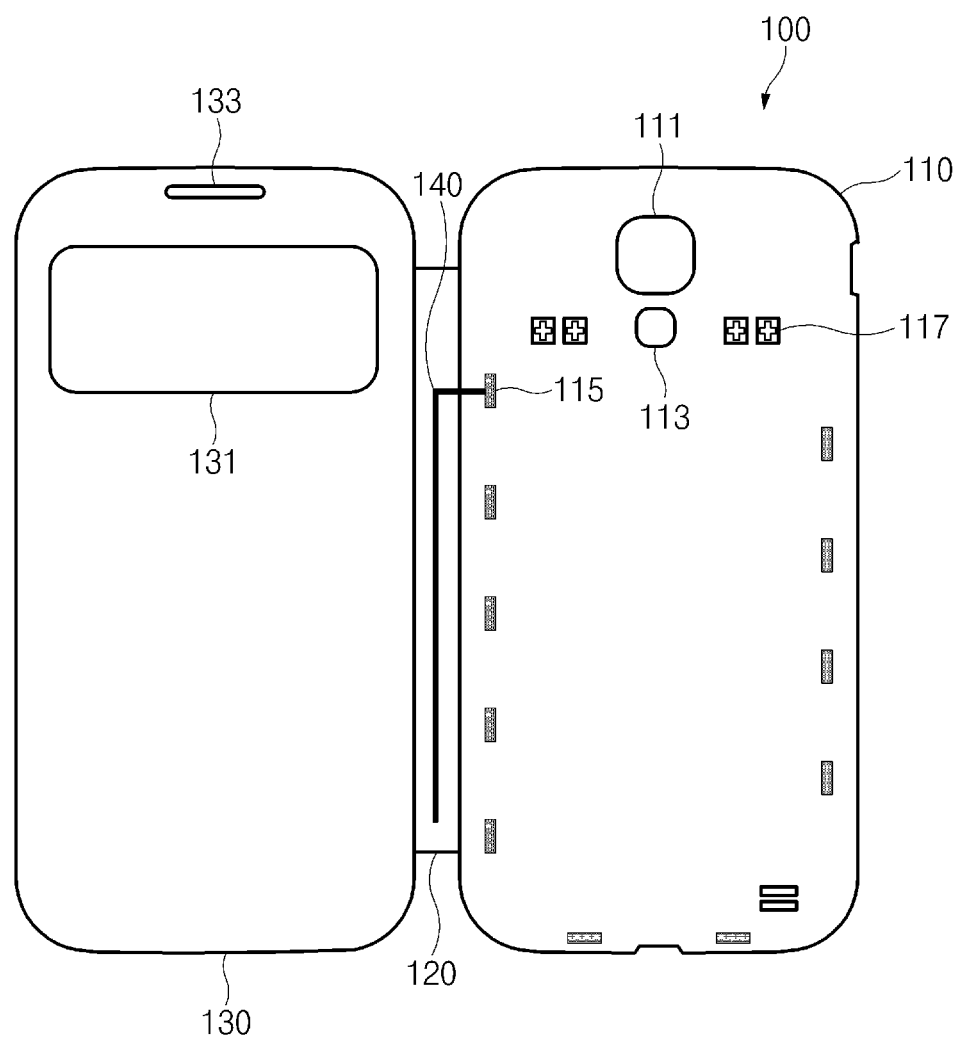
FIG. 3 is a diagram illustrating an antenna connected in a case structure, according to an embodiment of the present invention.

FIG. 3 is a diagram illustrating an antenna connected in a case structure, according to an embodiment of the present invention.

Referring to FIG. 3, the antenna structure 140 may be exposed from and disposed in one of the attachment structures 115. In FIG. 2, the feeding terminal 141 of the antenna structure 140 is exposed from and disposed in a portion of the rear cover 110, however, the connection of a feeding point may be instable due to the gap between the case 100 and the electronic device 200. According to an embodiment of the present invention, by using an additional metallic part, such as a C-clip, it is possible to assist so that the feeding terminal 141 of the antenna structure 140 and the feeding unit of the electronic device may make a stable connection. According to an embodiment of the present invention, since current is supplied through an attachment structure at which the case 100 attaches to the electronic device 200, as shown in FIG. 3, feeding may be stably provided without an additional part.

In the embodiment of the present invention illustrated in FIG. 2 or 3, the antenna 140 has a monopole antenna structure. According to an embodiment of the present invention, the antenna may have a dipole antenna or a PIFA structure, as described in greater detail with respect to FIG. 4.

Figure 4:
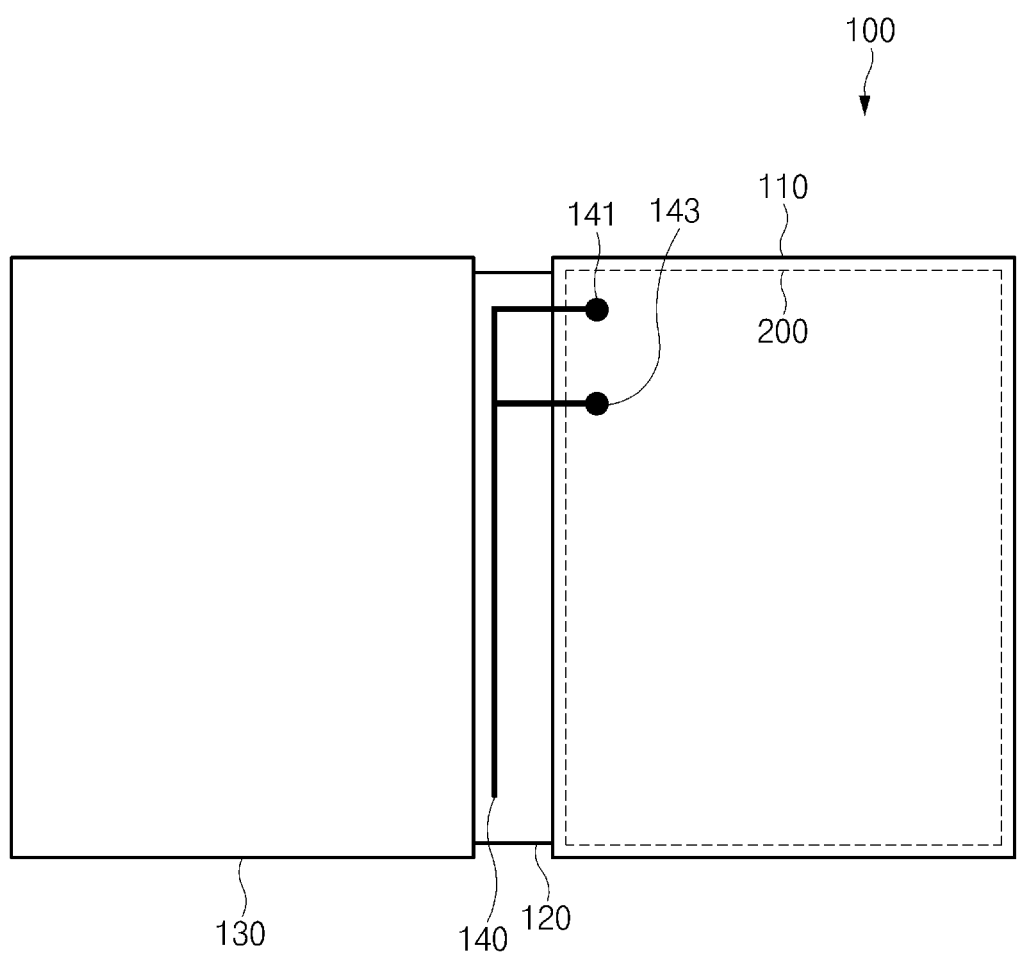
FIG. 4 is a diagram illustrating a planar inverted F antenna (PIFA) mounted on a case, according to an embodiment of the present invention.

FIG. 4 is a diagram illustrating a PIFA mounted on a case, according to an embodiment of the present invention.

Referring to FIG. 4, the case 100 attached to the electronic device 200 includes the antenna structure 140 in the connection portion 120. According to an embodiment of the present invention, the antenna structure 140 has two branches extending from the connection portion 120 to the rear cover 110, and ends 141 and 143 of each branch are exposed to the exterior of the rear cover 110.

According to an embodiment of the present invention, the ends 141 and 143 may be connected to portions exposed and disposed on the rear side of the electronic device 200. For example, the exposed end 141 may be connected to a ground GND portion located at the rear side of the electronic device 200. The exposed end 143 may be connected to the feeding unit of the electronic device 200. According to an embodiment of the present invention, the exposed ends of the antenna 140 may be connected to the ground or feeding unit of the electronic device to function as a PIFA.

In an embodiment of the present invention, the exposed ends 141 and 143 may be embodied as at least one attachment structure 115, as shown in FIG. 3. That is, one exposed end may be connected to the feeding unit of the electronic device 200 by the attachment structure 115, and the other exposed end may be connected to another attachment structure to form a ground.

The structure of the antenna 140 is not limited to the above-described examples. According to an embodiment of the present invention, the antenna 140 may have various shaped and various lengths in order to secure a resonance length for receiving a signal in a desired frequency band, in addition to a letter "L" shape or a letter "F" shape. According to an embodiment of the present invention, the antenna 140 may be connected to the electronic device 200 through two or more feeding terminals. Although FIG. 4 shows one feeding terminal and one ground terminal, there may also be two or more feeding terminals. In this case, resonance may be formed at different frequency bands by the length of an antenna radiator determined by each feeding terminal.

Figure 5:
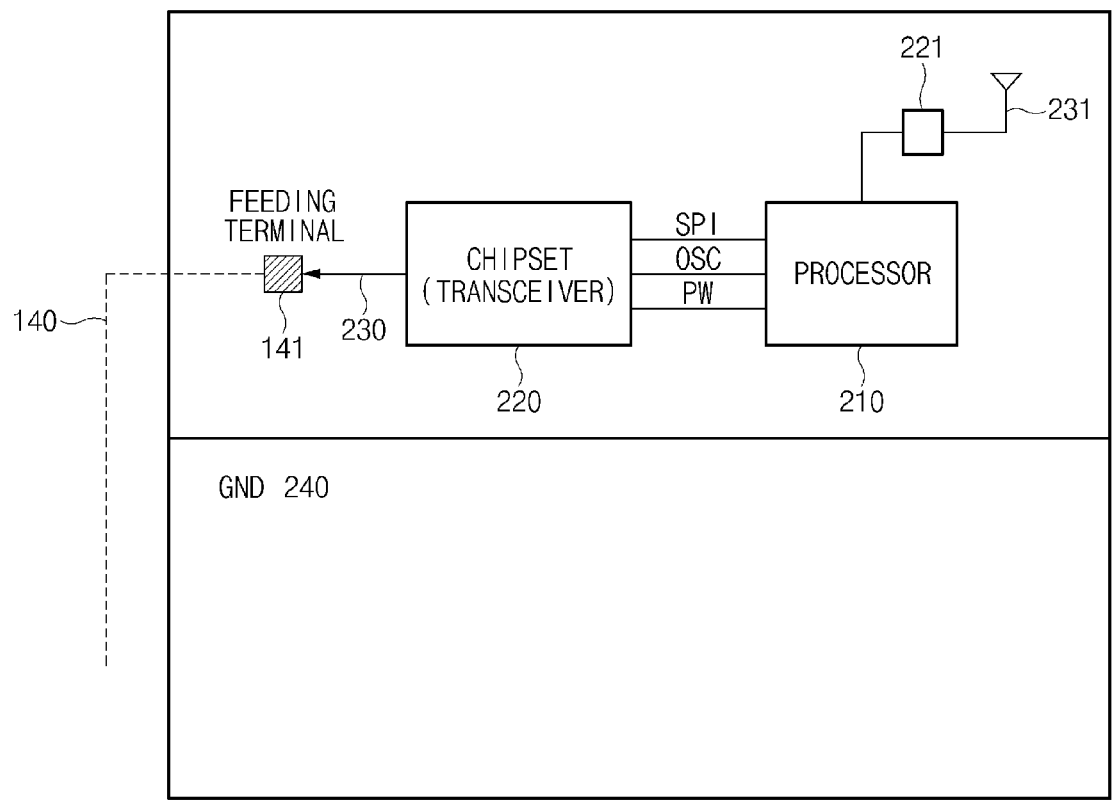
FIG. 5 is a diagram illustrating an electronic device, according to an embodiment of the present invention.

FIG. 5 is a diagram illustrating an electronic device, according to an embodiment of the present invention.

Referring to FIG. 5, the electronic device 200 includes a processor 210, a feeding unit 230 that may feed to the antenna 140 located at the connection portion 120 of the case 100, and a chipset or transceiver 220 that processes the transmission/reception of a signal from the antenna 140, for example. At least one of the components above may be implemented on a printed circuit board (PCB). According to an embodiment of the present invention, the electronic device 200 further includes an antenna 231 and a transceiver 221 for receiving a main band (or a main frequency band), such as, for example, a frequency band corresponding to a communication band supported by a country or communication company to be used by the electronic device 200 and a communication band of a main roaming country/region. In another embodiment of the present invention, the electronic device 200 may include an antenna and a transceiver for receiving signals related to commonly applied functions, such as, for example, Bluetooth, NFC and Wi-Fi functions.

According to an embodiment of the present invention, the electronic device 200 includes a ground region 240. Although FIG. 5 shows that the ground region is entirely located at the lower part, it may be arranged at various locations and in various shapes. According to an embodiment of the present invention, when the antenna 140 is of a PIFA type, the ground region 240 may be provided at a place where a ground terminal for a ground is exposed. For example, the ground region 240 may be provided at a region corresponding to the exposed portion 141 in FIG. 4.

According to an embodiment of the present invention, the feeding unit 230 may feed by connecting to a point of the rear side of the case 100 or to the feeding terminal 141 exposed from and disposed in an attachment structure of the rear side of the case 100. According to an embodiment of the present invention, when a signal corresponding to the antenna 140 is received, the chipset 220 may process a corresponding signal in association with the processor 210. According to an embodiment of the present invention, the processor 210 and the chipset 220 are connected by using serial communication, such as a serial peripheral interface (SPI), and an oscilloscope and an additional connection for feeding may be added. The chipset 220 may support at least one LTE band received by the antenna 140 or may support a T-DMB or S-DMB signal. In another embodiment of the present invention, the chipset 220 may support AM/FM radio received by the antenna 140.

Although FIG. 5 shows that the chipset 220 is located at a relative center of the electronic device 200, it may be located adjacent to the left region of the electronic device 200 (a region corresponding to an extension direction where the connection portion extends from the rear cover). Accordingly, it is possible to prevent a signal from weakening by radiation noise or decrease interference caused by coupling by an antenna that receives another frequency band.

Figure 6:
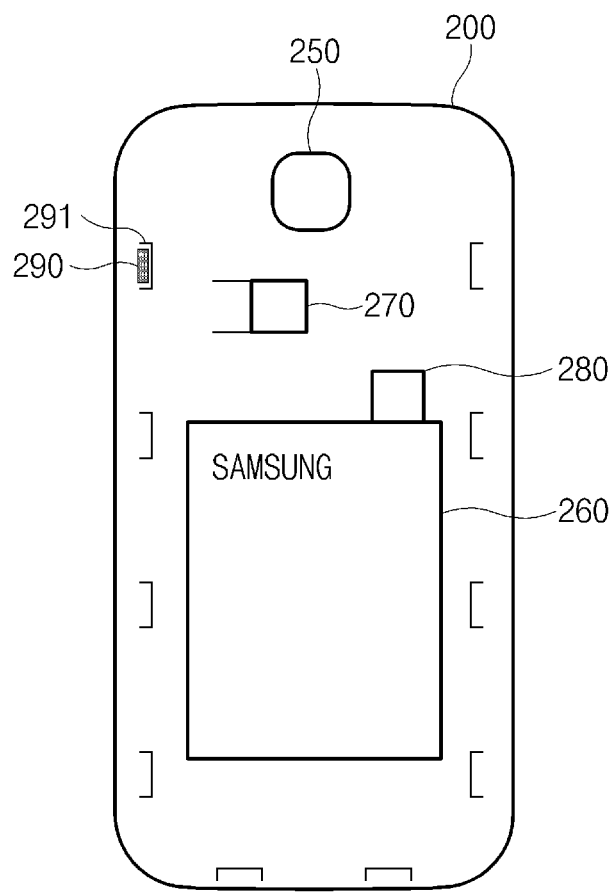
FIG. 6 is a diagram illustrating a rear side of an electronic device, according to an embodiment of the present invention.

FIG. 6 is a diagram illustrating a rear side of an electronic device, according to an embodiment of the present invention.

The rear side of the electronic device 200 includes a camera module 250, a battery 260, an external memory holding portion 270, a USIM holding portion 280, and a feeding unit 290 for connecting to the feeding unit exposed from and disposed on the rear cover of the case, for example. According to an embodiment of the present invention, the feeding unit 290 corresponds to the feeding unit 230 in FIG. 5 and may connect to the feeding terminal 141 of the antenna 140 when the electronic device 200 is attached to the case 100. The electronic device 200 may include a plurality of attachment structures 291 for attachment to the attachment structures of the case 100. According to an embodiment of the present invention, the feeding unit 290 is located at the attachment structure 291 and may be attached to the feeding terminal located at the attachment structure of the case 100. According to an embodiment of the present invention, the feeding unit 290 may be located at any region irrelevant to the location of the attachment structure 291 or a point corresponding to the feeding terminal 141 on the rear cover 110.

According to an embodiment of the present invention, the electronic device 200 may mount an antenna related to a function that has a high frequency of usage or should be fundamentally included (e.g., a main frequency band communication function, a Bluetooth function, or a Wi-Fi function), on the electronic device 200. According to an embodiment of the present invention, an antenna for transmitting or receiving a signal related to a function having a low frequency of usage or selectively used or in a selective frequency band may be implemented at a case connecting to the electronic device 200 and located at the outside of the electronic device 200. A chipset or a transceiver for processing an antenna signal when being connected to that antenna may be implemented in the electronic device 200. According to an embodiment of the present invention, by exposing a portion of an antenna included in the case from the rear cover and designing the rear side of the electronic device to enable feeding through an exposed point, it is possible to receive various antenna signals implemented through the case.

According to an embodiment of the present invention, the electronic device 200 may transmit and receive various signals according to the attached case. For example, when a user of an electronic device 200 that includes a built-in antenna not supporting a frequency band used in India wants to use a communication service in India, the user may purchase a case including an antenna supporting the frequency band used in India, attach the case to the electronic device, transmit and receive a communication signal serviced in India.

According to an embodiment of the present invention, it is possible to produce a product without a DMB function or a DMB antenna in the case of a global model. In this case, by attaching, the case in which an antenna for receiving DMB is built, to the product, it is possible to receive that broadcast in a country that supports DMB.

Figure 7:
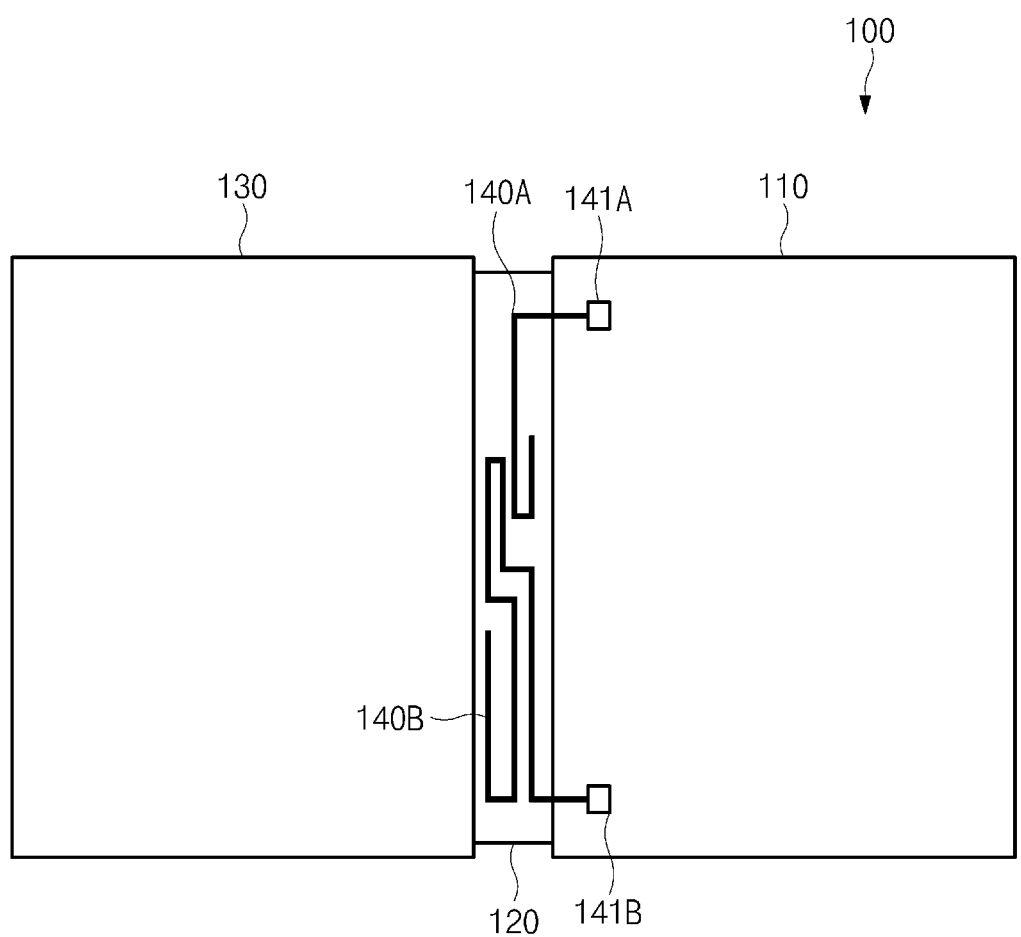
FIG. 7 is a diagram illustrating a case in which a plurality of antennas is built, according to an embodiment of the present invention.

FIG. 7 is a diagram illustrating a case in which a plurality of antennas is built, according to an embodiment of the present invention.

Referring to FIG. 7, the connection portion 120 of the case 100 includes first and second antenna devices 140A and 140B. The first antenna device 140A is exposed from the point 141A for feeding, and the second antenna device 140B is exposed from the point 141B for feeding.

According to an embodiment of the present invention, the first and second antenna devices 140A and 140B may have different structures and lengths. The two antenna devices may resonate at different frequency bands. Through such a structure, the electronic device may implement a multi carrier or carrier aggregation (CA) using an antenna built in the first and second antenna devices 140A and 140B and/or the electronic device.

FIG. 7 shows that the two antenna devices have different feeding terminals, but according to an embodiment of the present invention, different feeding terminals may also connect to one antenna, as previously described. According to an embodiment of the present invention, a plurality of antennas may be mounted according to a region of the connection portion 120 of the case 100 and the length of the antenna. For example, more antenna devices may be mounted on a case that may attach to a tablet having a relatively large size, to connect to the electronic device.

Figure 8:
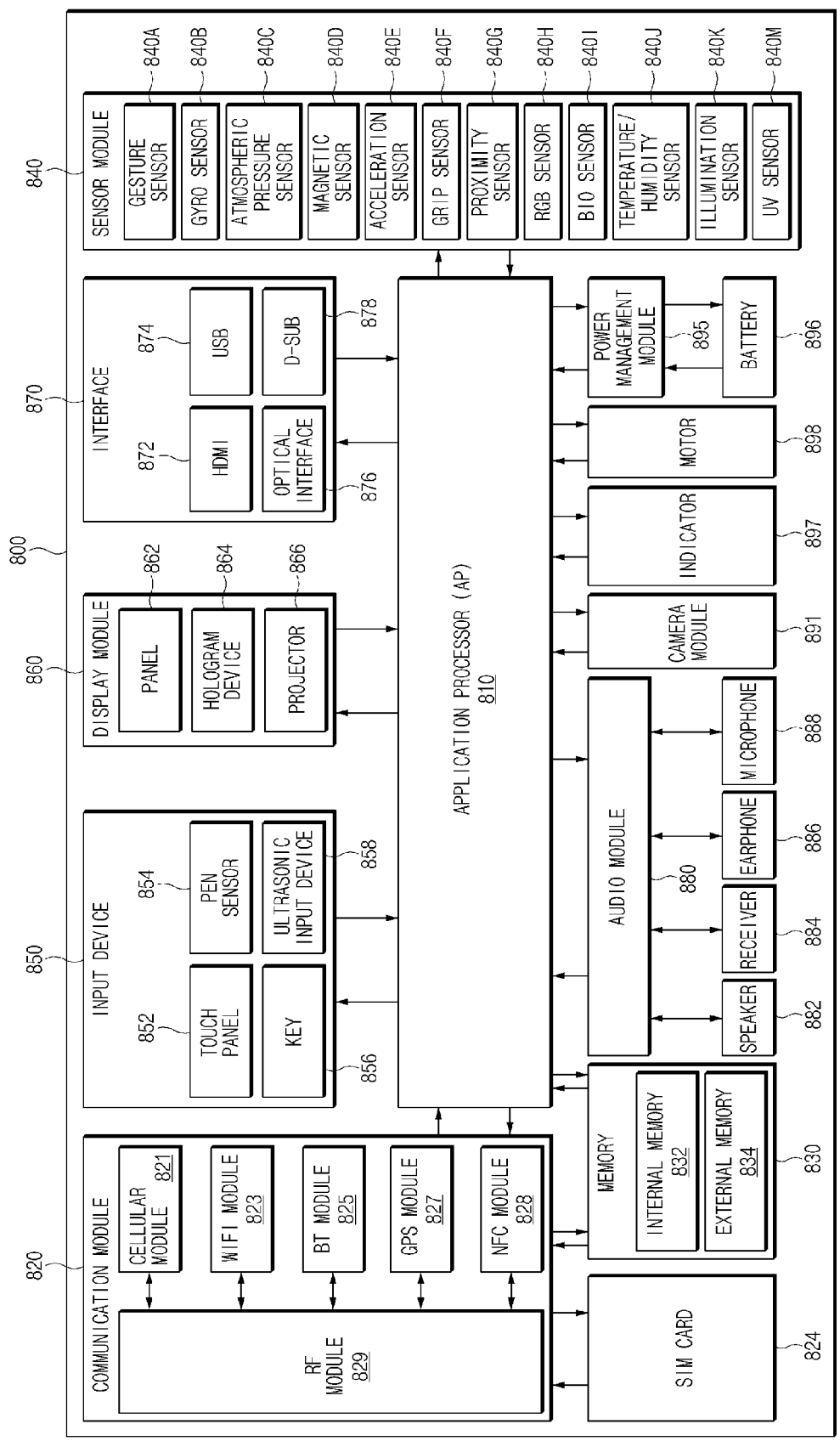
FIG. 8 is a diagram illustrating a structure of an electronic device, according to an embodiment of the present invention.

FIG. 8 is a diagram illustrating a structure of an electronic device, according to an embodiment of the present invention.

Referring to FIG. 8, an electronic device 800 includes at least one of one or more application processors (APs) 810, a communication module 820, a subscriber identification module (SIM) card 824, a memory 830, a sensor module 840, an input device 850, a display 860, an interface 870, an audio module 880, a camera module 891, a power management module 895, a battery 896, an indicator 897, and a motor 898.

The AP 810 (e.g., the processor 210) may execute an operating system or application programs to control a plurality of hardware or software components connected to the AP 810, and may perform processing and calculation on various pieces of data including multimedia data. The AP 810 may be implanted in a system on chip (SoC). According to an embodiment of the present invention, the AP 810 may further include a graphic processing unit (GPU).

The communication module 820 (e.g., the chipset (transceiver) 220, the antenna 231, and the transceiver 221) may perform data transmission and reception between the electronic device 800 and other electronic devices connected through a network. According to an embodiment of the present invention, the communication module 820 may include a cellular module 821, a Wi-Fi module 823, a BT module 825, a GPS module 827, an NFC module 828, and a radio frequency (RF) module 829.

The cellular module 821 may provide a voice call, a video call, a message service, or an internet service through a communication network (such as an LTE, LTE-A, CDMA, WCDMA, UMTS, WiBro or GSM network). Also, the cellular module 821 may use, for example, a subscriber identity module (such as the SIM card 824) to perform the identification and authentication of an electronic device in a communication network. According to an embodiment of the present invention, the cellular module 821 may perform at least some of the functions that the AP 810 may provide. For example, the cellular module 821 may perform at least some of multimedia control functions.

According to an embodiment of the present invention, the cellular module 821 may include a CP. Also, the cellular module 821 may be implemented in a SoC. FIG. 8 shows components such as the cellular module 821 (such as a CP), the memory 830, and the power management module 895 separately from the AP 810, but according to an embodiment of the present invention, the AP 810 may be implemented to include at least some (such as a cellular module 821) of the above-described components.

According to an embodiment of the present invention, the AP 810 or the cellular module 821 (such as a CP) may load and process, on volatile memories, commands or data received from at least one of a non-volatile memory connected to thereto or another component. Also, the AP 810 or the cellular module 821 may store, on non-volatile memories, data received from at least one of other components or generated by at least one of other components.

Each of the Wi-Fi module 823, the BT module 825, the GPS module 827, and the NFC module 828 may include a processor for processing data transmitted and received through a corresponding module, for example. FIG. 8 shows each of the cellular module 821, the Wi-Fi module 823, the BT module 825, the GPS module 827, and the NFC module 828 as a separate block, but according to an embodiment of the present invention, at least some (e.g., two or more) of the cellular module 821, the Wi-Fi module 823, the BT module 825, the GPS module 827, and the NFC module 828 may be included in one integrated chip (IC) or an IC package. For example, at least some (such as a communication processor corresponding to the cellular module 821 and a Wi-Fi processor corresponding to the Wi-Fi module 823) of processors corresponding to the cellular module 821, the Wi-Fi module 823, the BT module 825, the GPS module 827, and the NFC module 828, respectively may be implemented in one SoC.

The RF module 829 may perform data transmission and reception, such as transmission and reception of an RF signal. The RF module 829 may include e.g., a transceiver, a power amp module (PAM), a frequency filter or a low noise amplifier (LNA) though not shown. Also, the RF module 829 may further include a part such as a conductor or wire for transmitting and receiving electromagnetic waves in a free space when performing wireless communication. Although FIG. 8 shows that the cellular module 821, the Wi-Fi module 823, the BT module 825, the GPS module 827, and the NFC module 828 share one RF module 829, at least one of the cellular module 821, the Wi-Fi module 823, the BT module 825, the GPS module 827, and the NFC module 828 may transmit and receive an RF signal through a separate RF module according to an embodiment.

The SIM card 824 may be a card including a subscriber identity module and may be inserted into a slot that is formed on a specific location on an electronic device. The SIM card 824 may include unique identification information (such as an integrated circuit card identifier (ICCID)) or subscriber information (such as an international mobile subscriber identity (IMSI)).

The memory 830 may include an internal memory 832 or an external memory 834. The internal memory 832 may include at least one of e.g., a volatile memory (such as a dynamic RAM (DRAM), a static RAM (SRAM), or a synchronous dynamic RAM (SDRAM)) and a non-volatile memory (such as an one time programmable ROM (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present invention, the internal memory 832 may be a solid state drive (SSD). The external memory 834 may further include a flash drive, such as a compact flash (CF) drive, a secure digital (SD) drive, a micro secure digital (micro-SD) drive, a mini secure digital (mini-SD) drive, or an extreme digital (xD) drive, or a memory stick. The external memory 834 may be functionally connected to the electronic device 800 through various interfaces. According to an embodiment of the present invention, the electronic device 800 may further include a storage device (or storage medium), such as a hard disk drive (HDD)

The sensor module 840 may measure a physical quantity, sense the operation state of the electronic device 800 and convert measured or sensed information into an electrical signal. The sensor module 840 may include at least one of a gesture sensor 840A, a gyro sensor 840B, an atmospheric pressure sensor 840C, a magnetic sensor 840C, an acceleration sensor 840E, a grip sensor 840F, a proximity sensor 840G, a color sensor 840H (such as a red, green, blue (RGB) sensor), a bio sensor 840I, a temperature/humidity sensor 840J, an illumination sensor 840K, or a ultra violet (UV) sensor 840M, for example. The sensor module 840 may further include a control circuit for controlling at least one sensor that is included in the sensor module 840.

The input device 850 may include a touch panel 852, a (digital) pen sensor 854, a key 856, or an ultrasonic input device 858. The touch panel 852 may recognize a touch input by using at least one of capacitive, pressure-sensitive, infrared or ultrasonic techniques, for example. Also, the touch pane 852 may also further include a control circuit. In the case of the capacitive technique, a physical contact or proximity awareness is possible. The touch panel 852 may further include a tactile layer. In this case, the touch panel 852 may provide a user with a tactile response.

The (digital) pen sensor 854 may be implemented by using the same or similar method as that of obtaining a user's touch input or by using a separate sheet for recognition, for example. The key 856 may include a physical button, an optical key or a keypad, for example. The ultrasonic input device 858 is a device that may sense a sound wave with a microphone (e.g., a microphone 888) from the electronic device 800 and check data, through an input tool generating an ultrasonic signal, and the ultrasonic input device 256 may thus perform wireless recognition. According to an embodiment of the present invention, the electronic device 800 may also use the communication module 820 to receive a user input from an external device (such as a computer or server) connected thereto.

The display 860 may include a panel 862, a hologram device 864 or a projector 866. The panel 862 may be a liquid-crystal display (LCD) or an active-matrix organic light-emitting diode (AM-OLED), for example. The panel 862 may be implemented flexibly, transparently or wearably, for example. The panel 862 and the touch panel 852 may also be implemented in one module. The hologram device 864 may use the interference of a light to show a stereoscopic image in the air. The projector 866 may project a light onto a screen to display an image. The screen may be located internal or external to the electronic device 800, for example. According to an embodiment of the present invention, the display 860 may further include a control circuit for controlling the panel 862, the hologram device 864 or the projector 866.

The interface 870 may include a high-definition multimedia interface (HDMI) 872, a universal serial bus (USB) 874, an optical interface 876 or a D-subminiature (D-sub) 878. Additionally or alternatively, the interface 870 may include a mobile high-definition link (MHL) interface, an SD card/multi-media card (MMC) interface or an infrared data association (IrDA) interface, for example.

The audio module 880 may convert sound into an electrical signal or vice versa. The audio module 880 may process sound information input or output through a speaker 882, a receiver 884, an earphone 886 or the microphone 888, for example.

The camera module 891 is a device that may capture still pictures and moving pictures, and according to an embodiment, it is possible to include one or more image sensors (such as a front sensor or rear sensor), lens, an image signal processor (ISP), or a flash (e.g., an LED or a xenon lamp).

The power management module 895 may manage the power of the electronic device 800. Although not shown, the power management module 895 may include a power management integrated circuit (PMIC), a charger IC, or a battery or fuel gauge, for example.

The PMIC may be included in an IC or a SoC semiconductor, for example. Charging techniques may be classified into wired and wireless techniques. The charger IC may charge the battery and prevent overvoltage or overcurrent from a charger. According to an embodiment of the present invention, the charger IC may include a charger IC for at least one of a wired charging technique and a wireless charging technique. The wireless charging technique includes, for example, a magnetic resonance type, a magnetic induction type, or an electromagnetic wave type, and an additional circuit for wireless charging may be added such as a coil loop, a resonance circuit, or a rectifier.

The battery gauge may measure the level, current or temperature of the battery 896, or the voltage of the battery 896 during charging, for example. The battery 896 may store or generate electricity and use stored or generated electricity to supply power to the electronic device 800. The battery 896 may include a rechargeable battery or a solar battery, for example.

The indicator 897 may show the specific states of the electronic device 800 or a portion (e.g., the AP 810) of the electronic device 800, such as a booting state, a message state or a charged state. The motor 898 may convert an electrical signal into mechanical vibration. Although not shown, the electronic device 800 may include a processing device (e.g., a GPU) for supporting a mobile TV. The processing device for supporting the mobile TV may process media data according to a DMB, digital video broadcasting (DVB), or media flow standard.

Each of the above-described elements of the electronic device according to various embodiments of the present invention may include one or more components and the names of corresponding elements may vary depending on the type of an electronic device. The electronic device according to various embodiments of the present invention may include at least one of the above-described elements and some elements may be left out or other elements may be further included. Also, some of the elements of the electronic device according to various embodiments of the present invention are combined to form an entity, which may equally perform the functions of corresponding elements before being combined.

The term "module" used in various embodiments of the present invention may mean a unit including one of hardware, software, and firmware, for example, or a combination of two or more thereof. The "module" may be interchangeably used with the term "unit", "logic", "logical block", "component", or "circuit", for example. The "module" may be an elementary unit of or a portion of an integral component. The "module" may also be an elementary unit for performing one or more functions or a portion of the elementary unit. The "module" may be implemented mechanically or electronically. For example, the "module" according to various embodiments of the present invention may include at least one of an application-specific integrated circuit (ASIC) chip, a field-programmable gate array (FPGA) and a programmable-logic device that perform some operations and has been known or will be developed in the future.

The electronic device 800 (e.g., the electronic device 200), according to various embodiments of the present invention, includes the communication module 820 that communicates with the AP 810. The communication module 820 includes the RF module 829 for transmitting and receiving an antenna signal. For example, the RF module 829 corresponds to the above-described chipset or transceiver 220.

The electronic device 800 may transmit and receive a signal through an external antenna (e.g., the antenna 140 built in the connection portion 120 of the case) connected to the case, in addition to an internal antenna connected to the RF module 829. In this case, the RF module 829 may be located in the electronic device 800 and a structure for feeding to the external antenna may be located at the rear side of the electronic device 800. Such a feeding structure (feeding unit) may be connected to the external antenna when the case is attached to the electronic device 800.

The communication module 820 may recognize an antenna included in the case and provide the AP 810 with a related notice, when a specific case is connected to the electronic device 800. The AP 810 may recognize a frequency band supported by the antenna based on impedance information or impedance measurement for an antenna included in the case in order to recognize the antenna. The AP 810 may provide the communication module 820 with a roaming setting for transmitting/receiving a signal in a frequency band corresponding to that antenna. The communication module 820 may receive a certain frequency signal through an antenna included in a case. The certain frequency signal may be a frequency signal corresponding to an LTE band depending on at least one country/carrier.

In another embodiment of the present invention, when a case is connected, the AP 810 may enable a DMB application or a DMB service to be performed when a signal in a frequency band corresponding to an antenna included in the case is a frequency for receiving DMB.

According to an embodiment of the present invention, an antenna for a specific function is mounted on a case of a terminal, so it is possible to provide a user with a choice to use the function (e.g., a frequency band). Also, by decreasing the number of antennas mounted on the terminal, it is possible to implement a slim design and the common design of a PCB, and thus, it is possible to increase efficiency in production.

According to an embodiment of the present invention, since heat emission and interference are decentralized compared when all antenna devices are mounted on the electronic device, there is an effect in that the efficiency of an antenna increases.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A case for an electronic device, the case comprising:
   a rear cover configured to attach to at least a portion of a rear side of the electronic device;
   a front cover configured to removably cover at least a portion of a front side of the electronic device; and
   a connection portion that connects the front cover and the rear cover, and includes a radiator portion of an antenna structure for transmitting and receiving signals in at least one frequency band,
   wherein the antenna structure comprises a detachable feeding terminal that is disposed directly in the rear cover in order to be connected to the rear side of the electronic device.

2. The case according to claim 1, wherein the rear cover comprises a plurality of attachment structures for attaching to the rear side of the electronic device, and the detachable feeding terminal is disposed in at least one of the plurality of attachment structures.

3. The case according to claim 1, wherein the antenna structure is a monopole antenna structure.

4. The case according to claim 1, wherein the antenna structure further comprises a ground terminal, the ground terminal is disposed in a second region of the rear cover, and the ground terminal is connected to a ground at a rear side of the electronic device.

5. The case according to claim 1, wherein the antenna structure is a planar inverted F antenna (PIFA) structure.

6. The case according to claim 1, wherein the antenna structure is configured to receive a frequency in a first frequency band that differs from a second frequency band received by an antenna built in the electronic device.

7. The case according to claim 1, wherein the antenna structure is configured to receive frequencies that overlap at least a portion of a frequency band received by an antenna built in the electronic device.

8. The case according to claim 1, wherein the antenna structure is configured to receive a frequency band corresponding to at least one long term evolution (LTE) band.

9. The case according to claim 1, wherein the connection portion further comprises an additional antenna structure different from the antenna structure.

10. An electronic device configured to be removably attached to a case including a front cover, a connection portion, and a rear cover, the electronic device comprising:
    a processor;
    a chipset configured for use with at least one antenna in the connection portion of the case; and
    at least one feeding unit configured to connect to the at least one antenna in the connection portion of the case,
    wherein at least a portion of a rear side of the electronic device is attached to at least a portion of the rear cover of the case, and the at least one feeding unit is disposed at the rear side of the electronic device and connected to at least one feeding terminal of the at least one antenna disposed in the rear cover of the case, and
    wherein the at least one antenna comprises the at least one detachable feeding terminal that is disposed directly in the rear cover in order to be connected to the rear side of the electronic device.

11. The electronic device according to claim 10, wherein the rear side of the electronic device comprises a plurality of attachment structures attachable to the rear cover of the case, and the at least one feeding unit is disposed in at least one of the plurality of attachment structures.

12. The electronic device according to claim 10, wherein the electronic device includes at least one built-in antenna, wherein the built-in antenna is configured to receive at least one of wideband code division multiple access (WCDMA) band, Bluetooth, and Wi-Fi.

13. The electronic device according to claim 10, wherein the chipset is configured to support at least one long term evolution (LTE) band.

14. The electronic device according to claim 10, wherein the chipset is configured to support at least one of terrestrial-digital multimedia broadcasting (T-DMB) and satellite-digital multimedia broadcasting (S-DMB).

15. The electronic device according to claim 13, wherein the processor is configured to receive a frequency signal corresponding to the at least one LTE band in response to recognition of the at least one antenna in the case, when the case is attached to the electronic device.

16. The electronic device according to claim 14, wherein the processor is configured to perform a digital multimedia broadcasting (DMB) service in response to recognition of the at least one antenna in the case, when the case is attached to the electronic device.

17. The electronic device according to claim 16, wherein the processor is configured to recognize a frequency band supported by the at least one antenna in the case based on impedance information on the at least one antenna.

18. An encased electronic device comprising:
    a processor;
    a chipset configured for use with at least one antenna;
    at least one feeding unit configured to connect to the at least one antenna;
    a rear cover disposed on a rear side of the encased electronic device;
    a front cover configured to removably cover at least a portion of a front side of the encased electronic device; and
    a connection portion that connects the front cover and the rear cover, and includes the at least one antenna for transmitting and receiving signals in at least one frequency band,
    wherein the at least one antenna comprises a detachable feeding terminal that is disposed directly in the rear cover in order to be connected to the rear side of the encased electronic device.

19. The encased electronic device according to claim 18, wherein the at least one antenna is configured to function in a frequency band of a country in which an antenna of the encased electronic device does not function.

* * * * *